Figure 1:
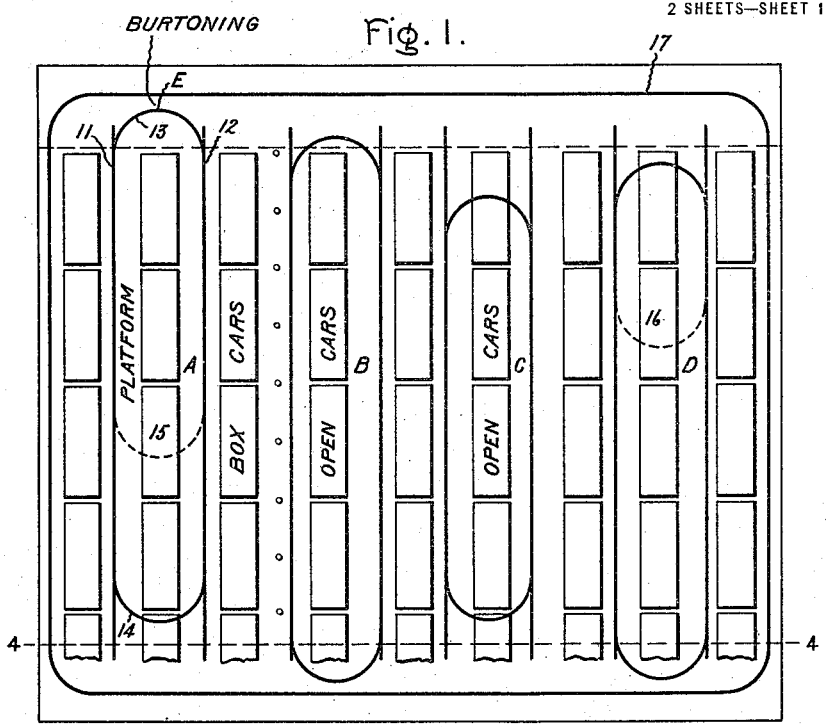

H. McL. HARDING.
TELPHERAGE SYSTEM.
APPLICATION FILED SEPT. 7, 1917.

1,280,721.

Patented Oct. 8, 1918.
2 SHEETS—SHEET 1.

Inventor:
Henry McL. Harding,
by His Attorney.

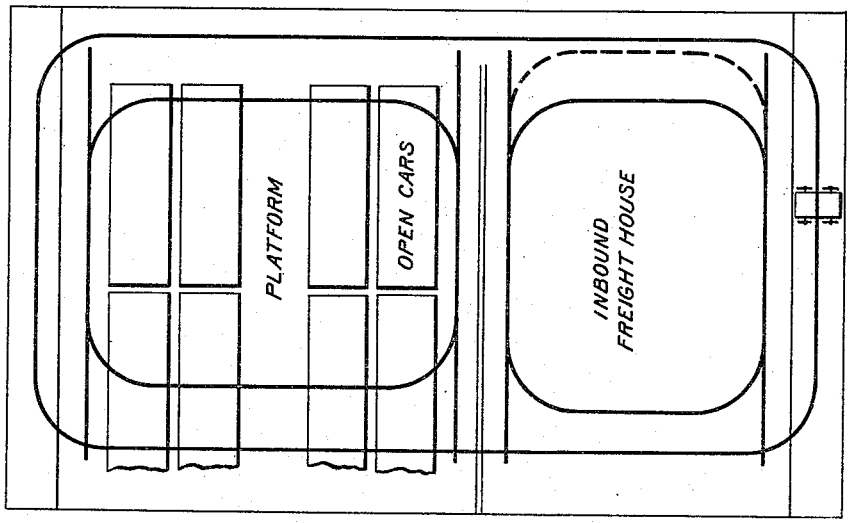
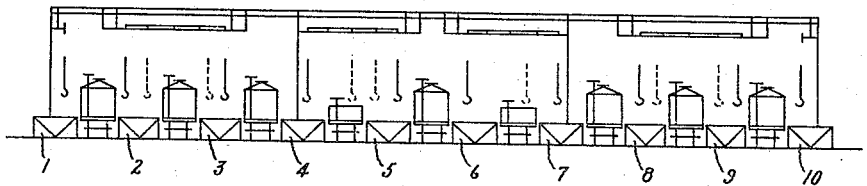
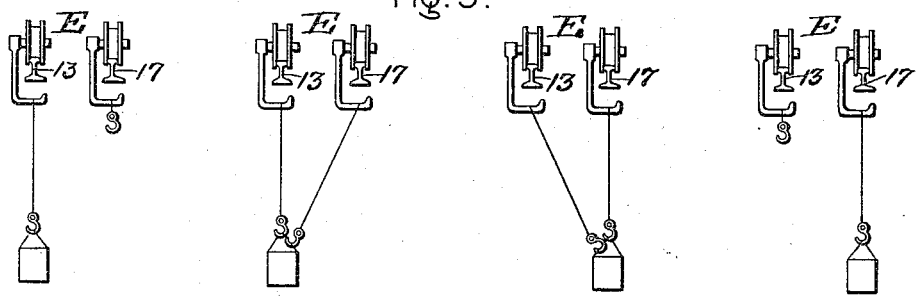

UNITED STATES PATENT OFFICE.

HENRY McL. HARDING, OF NEW YORK, N. Y., ASSIGNOR TO GENERAL ELECTRIC COMPANY, A CORPORATION OF NEW YORK.

TELPHERAGE SYSTEM.

1,280,721.  Specification of Letters Patent.  Patented Oct. 8, 1918.

Application filed September 7, 1917. Serial No. 190,253.

*To all whom it may concern:*

Be it known that I, HENRY McL. HARDING, a citizen of the United States, residing at New York, county of New York, State of New York, have invented certain new and useful Improvements in Telpherage Systems, of which the following is a specification.

My invention relates to the handling of merchandise at railway terminals, wharves, warehouses, manufacturing plants and other storage places and has for its object the provision of improved means whereby merchandise may be handled with a minimum amount of labor, storage area and plant equipment, and the securing of a maximum speed capacity in transference and handling so that the cost of transportation (which includes transference and handling) is reduced to a minimum.

The scarcity and ever increasing cost of labor has rendered the problem of handling freight and other merchandise a very serious one and the tendency of modern times is to reduce the labor item to a minimum by providing labor saving devices and mechanical freight handling apparatus wherever possible. One of the most effective agencies in mechanical freight handling is the over-head carrier system, since it does not occupy valuable floor space and is out of the way when not in use. In my previous Patent No. 961,348, granted June 14, 1910, I have disclosed and broadly claimed an overhead carrier system which is peculiarly adapted for the handling of merchandise. This system is known as the "adjustable loop system". The characteristic feature of this system is that while it only necessitates a single track (which in most cases will be re-entrant) upon which the carrier or carriers travel (generally in one direction), the carriers nevertheless serve the entire space inclosed by the track. This is accomplished by having a portion of the track adjustable so that by moving it to various positions the carriers cover the entire space inclosed. In the particular arrangement shown there are two parallel tracks one on each side of the area to be served, and cross tracks, one or more of which may be movable so as to make a closed loop over which the carriers may operate continuously in one direction, and by moving the cross track (or cross tracks if more than one is adjustable), the carriers may be caused to travel over every square foot of space inclosed by the parallel side tracks and hence serve the entire area.

One of the objects of my present invention is to increase the utility of my "adjustable loop system" by extending its range and increasing its flexibility. In a system of this character and in fact in any overhead system it is very desirable to eliminate as far as possible the use of switches for shifting the carriers from one track to another. Switches are a source of trouble, both because of their inherent mechanical features, and because of the complications involved in operating them and the danger arising from a failure of operation. In fact, one of the great advantages of my "adjustable loop system" is the complete absence of switches. In many cases, however, the area to be served is so large that a single adjustable loop or unit such as I have just described would not be practicable. If the loop should cover such a large area, the number of carriers must be increased proportionally so as to handle the material. When, however, the number of carriers is increased, the danger of congestion increases accordingly so that the carriers are not being used efficiently.

Take, for instance, a railway transfer station and assume that there are 100 cars in the station on five tracks, each car having, on the average, freight for twelve distributing stations. The material in each car, therefore, must be distributed to any twelve of the 100 cars. The material must ordinarily be transferred in a few hours and a large number of carriers will be required. If a single loop were employed obviously there would be congestion, since one carrier stopping to load or unload would stop the entire system.

In carrying out my invention, I overcome these difficulties by providing a number of adjustable units of the type above described and transferring the load from one loop to another without the use of switches. For the reasons above pointed out, it is objectionable to employ switches for shifting the carrier from one loop to another and there is also the additional objection that the use of switches will slow down the operation of the system.

I therefore provide a novel system involving the "burtoning" of the load from one adjustable loop unit to another. The term "burtoning of the load" as employed in the art, refers to the shifting of the load from one crane hook to another without resting it. In one form of my invention I provide a number of adjustable loop units adjacent to each other and surround these units by a track which runs adjacent to all of them. This surrounding track will, in most cases, be reëntrant so that the carriers may travel upon it always in one direction and in this way the load may be shifted from one adjustable loop to another by "burtoning" the load. It will be obvious that with this system the congestion will be greatly reduced and almost eliminated, since the stops for unloading are made upon a number of different tracks instead of one.

Figure 2:
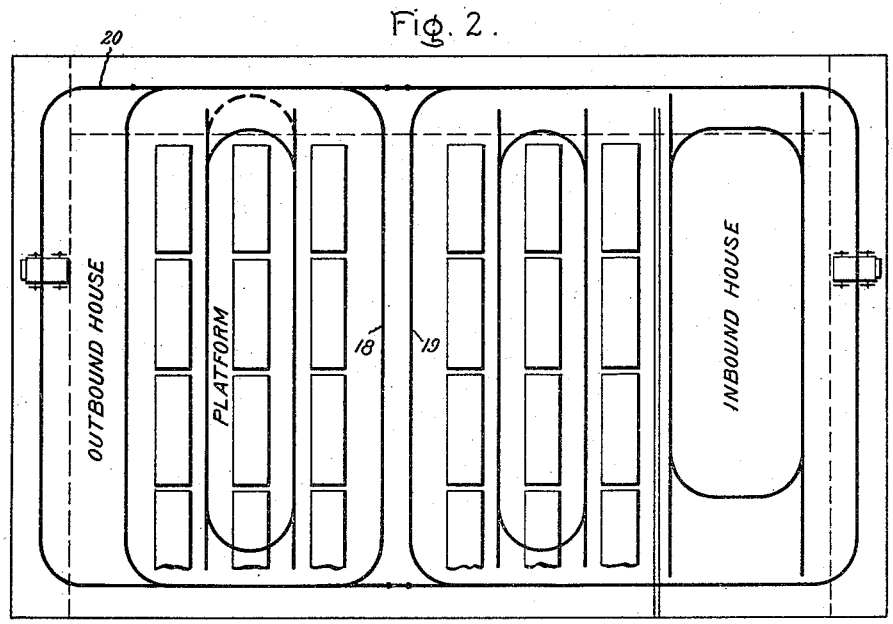

In the accompanying drawing, Figure 1 is a plan view showing in a diagrammatic way one embodiment of my invention. Figs. 2 and 3 are similar views of somewhat modified arrangements. Fig. 4 is a sectional elevation taken on the line 4—4 of Fig. 1, and Fig. 5 is a view showing in four steps how "burtoning" is accomplished.

Referring first to Fig. 1, it will be seen that I have shown a railway terminal laid out in the form of a transfer station. As shown, provision is made for nine strings of cars, each string in its particular terminal containing 20 cars (not all shown). Of course, the number of cars in each string and the number of strings may be varied but this is a convenient arrangement to deal with.

Referring to Fig. 4, it will be seen that there are 10 platforms numbered 1 to 10, platforms 1 and 10 being on the outside, the tracks being arranged between the consecutive platforms. The building structure is not shown with the exception of the structure for supporting the mono-rail which is shown in Fig. 4. By referring to Fig. 1 it will be seen that four over-head mono-rail cranes of the "adjustable loop" type, covered by my previous patent above referred to, are indicated in outline. There is an adjustable loop directly over alternate tracks and the loops are close enough together so that a track between adjacent loops may be served by either loop adjacent to it. A detailed description of the "adjustable loop system" is unnecessary, since it is fully described in my previous patent above referred to. In a general way it may be said, however, that in the arrangement shown each adjustable loop comprises parallel over-head mono-rails 11—12 and two end members 13—14, which make the track reëntrant, and which may be adjusted so that the entire area inclosed between these two parallel tracks may be served.

Surrounding all of these adjustable-loop tracks is a mono-rail track 17, the sides of which run close enough to the tracks so as to serve the outer strings of cars. The ends of this inclosing track are also sufficiently near the ends of the adjustable loops so that the load may be shifted from the inclosing track to the adjustable loop or vice versa. The shifting of the load in this way is commonly known as "burtoning" and it consists in shifting the load from the hook of one crane to the hook of another without resting the load. Fig. 5 shows how this is commonly done. This "burtoning" or shifting of the load will take place at the end of the adjustable loop as shown at E.

In order to illustrate the operation of my system, let it be assumed that car 15 in the second string contains freight which is to be transferred to car 16 in the eighth string of cars. The freight will be taken out of car 15 and deposited on platform No. 2, and we will assume that the carriers on the inclosing track 14 run around in a clock-wise direction. The freight in car 15 which is destined for car 16 and which is now on the platform No. 2 will be picked up by the carrier traveling on the adjustable loop A, which we will assume also travels in a clock-wise direction. One of the adjustable cross-tracks of the adjustable loop A will be shifted so as to be over car 15 as shown in dotted lines and the other cross-track will be shifted to a point adjacent to track 14, as shown at E. When the load gets to point E, it will be "burtoned" on to a carrier on track 17, as shown in Fig. 5, and this carrier on track 17, will move forward until it is opposite the adjustable loop D over the track on which car 16 is located. The cross track of the adjustable loop D being shifted adjacent to track 14, the load will be once more "burtoned" to the carrier of adjustable loop D and transferred to the platform opposite car 16. For this purpose the second cross rail may also be shifted over the car 16 as shown in dotted lines. The transfer in each case will take place very rapidly so that the carrier on track 17 may proceed on its way promptly without stopping the travel of the other carriers which are following. It is obvious that car 15 may contain freight for other cars in the same string as car 16 in which case the freight for the other cars might accompany that for car 16. The carrier on adjustable loop D would then stop opposite car 16 and then pass on to the succeeding car for which it carries freight. The delay in each case on the adjustable loop would be of minor importance as compared with what the same delay would be if it took place on the main track on which there are a number of carriers. In other words, with my arrangement freight may be shifted from any car to any other car with the minimum inconvenience due to stoppage of the carriers.

In Fig. 2 I have shown a slightly different arrangement adapted to a combined out-bound and in-bound freight terminal. As shown, there is an out-bound freight house on one side of the terminal and an in-bound freight house on the opposite side. There is a platform adjacent each string of cars and between the cars, and a platform for wagons at both the in-bound and the out-bound freight house. I have shown tracks for six strings of cars. For convenience these strings of cars may be divided into two sections each containing three cars, each section being surrounded by an inclosing track 18—19. These two sections are, however, connected by outside track 20 the ends of which extend to the extreme outside platform. As shown, there are three adjustable loops, one over the center track of each section and one in the in-bound house. From this arrangement it will be seen that freight may be transferred from any car to any other car or from either freight house to any car or vice versa. The transfer from one track to another will take place in the same way as that described in connection with Fig. 1.

Fig. 3 shows a slightly different arrangement by which my system is applied to in-bound freight terminals. In this case there is an in-bound freight house in which is one of my adjustable loop tracks, and four tracks in pairs with a platform between the pairs. These four tracks are served by an adjustable loop which incloses the four tracks and the intervening platforms. The operation of this particular arrangement will be obvious from the foregoing description. In fact, the principal object in showing these various arrangements is to bring out the fact that a very wide number of plans or arrangements are possible and that no attempt is being made to illustrate them all. My object is to show in general my invention applied to two or three particular arrangements of terminaling. The invention is in no sense limited to any particular arrangement except as limited by the scope of the claims annexed hereto.

What I claim as new and desire to secure by Letters Patent of the United States, is,—

1. The method of handling merchandise which consists in shifting a suspended load from an overhead track carrier on a stationary track which can serve only an elongated strip beneath the track to an overhead carrier on an independent reëntrant track which serves the entire area inclosed by the reëntrant track.

2. The method of handling merchandise which consists in providing a suspended reëntrant track and a carrier which serves the entire area inclosed by the track, a stationary transfer track and carrier which run adjacent to the reëntrant track, and then transferring a suspended load from one carrier to the other.

3. In a carrier system in combination a plurality of overhead tracks each having an adjustable portion for varying the area inclosed by the track, a carrier movable over each track to serve the area inclosed thereby and a stationary overhead track and carrier therefor surrounding said adjustable tracks and adjacent thereto at a distance to permit a suspended load to be shifted from one carrier to the other.

4. In a carrier system in combination with an overhead looped track having parallel sides and a cross track movable between said parallel tracks and coöperating therewith to close the loop, of a carrier traveling on said tracks, and a stationary track having a carrier thereon and paralleling at least a portion of said looped track at a distance to permit the suspended load to be shifted from one carrier to the other.

5. In a carrier system in combination a reëntrant over-head track having a movable portion for varying the area inclosed by said track, a carrier movable over said track to serve the inclosed area as the track is adjusted, and a track having a carrier thereon and paralleling at least a portion of the reëntrant track at a distance to permit a suspended load to be shifted from one carrier to the other.

6. In a carrier system in combination, a plurality of overhead reëntrant tracks each having a movable portion for varying the area inclosed by the track, a carrier movable over each track to serve the area inclosed thereby, and a stationary overhead track having a carrier running adjacent to the reëntrant tracks at a distance to permit a suspended load to be shifted from one carrier to the other.

In witness whereof, I have hereunto set my hand this fourth day of September, 1917.

HENRY McL. HARDING.